Jan. 22, 1963  R. L. ECKERT ETAL  3,074,685
ANTI-VIBRATING FLUID CONTROL VALVE
Filed Sept. 1, 1959  2 Sheets-Sheet 1

INVENTORS
ROBERT L. ECKERT
WILLIAM G. CASEY
BY
Thomas S. MacDonald
ATTORNEY

INVENTORS
ROBERT L. ECKERT
WILLIAM G. CASEY

ATTORNEY

United States Patent Office 3,074,685
Patented Jan. 22, 1963

3,074,685
ANTI-VIBRATING FLUID CONTROL VALVE
Robert L. Eckert and William G. Casey, Long Beach, Calif., assignors to North American Aviation, Inc.
Filed Sept. 1, 1959, Ser. No. 837,547
5 Claims. (Cl. 251—77)

This invention relates to a fluid control valve and more particularly to a pilot for a poppet type fluid control valve having a venturi type passage therein.

The prior art suggests valves which are capable of use with operating pressure ranges of zero to 5000 p.s.i.g.; however, there are none which can operate at ambient temperatures of −320° F. and +165° F., as well. Furthermore, the well known fluid valves of the prior art are oft-times sensitive to vibrational shocks and also realize a substantial pressure head loss between the inlet and outlet ports due to the inefficient construction thereof.

An object of this invention is to provide a novel anti-vibration pilot valve utilized to control the opening and closing of a fluid control valve.

Other objects and features of this invention will become apparent from the following specification when read in connection with the accompanying drawings wherein.

Figure 3:
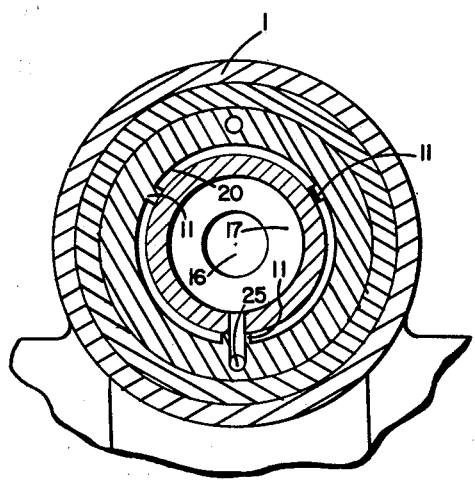
FIG. 3 is a cross-section taken on line 3—3 of FIG. 1.

In the illustrated embodiment of the invention, the fluid control valve comprises a main body 1 having an inlet port 2 and an outlet port 3 with a main chamber therebetween. A chamber member or island 10, having a tapered portion 12, is fixedly secured to the main body and defines a fluid passage therewith. As shown in FIG. 3, three lugs 11 project from the main body 1 and are spot welded or brazed to the chamber member 10. It is to be understood that any number of lugs 11 may be employed or other types of fastening means may be used to connect the main body and chamber member. Fluid enters the valve at the inlet port and maintains a constant flow area through passage section 4 and straight section 5. The flow area gradually decreases in passage section 6 to a minimum throat area 8 which is preferred to be approximately 75% of the original flow area. This construction is similar to a venturi type meter section. The exit cone or diffuser as shown at 9 has an included angle of about 5 to about 7 degrees. The fluid increases in velocity at the throat area 8, and decreases the pressure therein, which low pressure is utilized to control the opening and closing of a valve poppet 13. Without this low pressure the device would not operate at low operating pressures.

The main poppet 13 is located on the longitudinal axis of the main body passage and is slidably mounted in a cavity of the chamber member 10. The main poppet has a tapered portion 14 on which is formed a finely lapped spherical segment portion 15 adapted to engage the finely lapped main seat 7 in the inner passage of member 1 to stop the flow of fluid. This sealing arrangement provides for close contact over a relatively large area, enabling the lapped surfaces to contact even though they may be slightly misaligned. A recess 16 is defined in the main poppet and houses a spring 22. In actual practice the poppet will operate without the spring 22, however; it aids in a quick responsive closing of the poppet member. The spring 22 will also function to keep the main poppet in a closed position during shipping and storing. On the other end of the main poppet is the flange 17 having a groove 18 thereon. A piston ring 23 acting as a secondary orifice is located in the groove and allows a small fluid flow therearound. The piston ring is preferably made of a Kel-F (plastic) material, although other materials are usable. Advantages of the Kel-F material include: providing for a relatively loose fit between the piston and cylinder wall, thereby alleviating fine machining problems, permitting sufficient leakage to pressurize the actuation chamber while still being tight enough to permit a pressure build-up therein, acting as a filter and bearing and permitting a limited amount of side displacement of the piston for alignment of the main poppet seats 7 and 15. The piston ring 23, due to the operating characteristics of the valve, does not have to be a perfect dynamic type, thus alleviating many manufacturing problems.

Flange 17 and the inner cylindrical surface of the cavity of the chamber member 10 define a pressure chamber 19 and an actuation chamber 20. A chamber port 21 connects the pressure chamber with the flow passage and provides the pressure chamber 19 with a pressure equalling that of the static inlet pressure. A metering groove 24 acting as a primary orifice connects the pressure and actuation chambers and provides for a quick response of the poppet upon the closing thereof. The metering groove 24 together with the small clearance formed around the piston ring 23 are defined herein as the upstream orifice.

A downstream passage 25 is formed in the main body and connects the actuation chamber by a passage in one of the lugs 11 (FIG. 3) with the exit cone 9 of the flow passage. The downstream passage 25 terminates in a downstream orifice 33 which cooperates with the aforementioned upstream orifice to control the opening and closing of main poppet 13. A notch 26 is formed on the main body, adjacent the termination of downstream orifice 33 to decrease turbulence of the exiting fluid. This notch 26 is constructed aproximately as wide as the downstream orifice 33 and projects toward the outlet port 3. Thus, it can be seen that the only fluid flow realized by actuation chamber 20 flows from the pressure chamber 19 via pressure chamber port 21.

The anti-vibration pilot valve is shown generally at 30 and comprises an inlet passage 31 and a tube 32 forming the downstream orifice 33 which passage and orifice constitute the downstream flow passage 25. An energizing coil 34 houses a cylindrically shaped solenoid core 35 having a post 36 formed thereon. The post 36 terminates in the spherical head 37 and has a post step 38 formed on a mid-portion thereof. A cylindrical tube shaped plunger 40 surrounds the post and adapted to be longitudinally actuated by the coil 34. An adjustment member 41 is threadably mounted in the plunger 40 and a lock screw 42 is utilized to fix the relative positioning thereof. A recess 43 formed on the adjustment member 41 is adapted to open the downstream orifice 33 by moving a control poppet 45. A spring 44 is positioned between the core 35 and the adjustment member 41 so as to urge the adjustment member towards the outlet passage 33, in abutting relation to tube 32.

The relatively small poppet 45 is formed of a pin portion 46 and a downwardly extending cup shaped portion 47, the joinder of which forms a ledge 48 in alignment with the recess 43 and adapted to be longitudinally moved thereby. The finely lapped spherical head of pin portion 46 is positioned to close the finely lapped seat of passage 33. The cup shaped portion 47 sits on the spherical head 37 of post 36 and a universal type of joint is formed therebetween. A spring 39 urges the poppet 45 toward the outlet passage 33 to effect the closing thereof.

Operation

To close the main poppet 13 (shown open in FIG. 1), the solenoid 30 is de-energized allowing the spring 44 to urge the adjustment member 41 against tube 32 and permit the spherical head of control poppet 45 to close downstream orifice 33 under the biasing effect of spring 39. The upstream pressure $P_1$ enters the pressure chamber 19 and seeps into actuation chamber 20 by way of the upstream orifice formed by the slight clearance around piston ring 23, acting in conjunction with metering groove 24. It is to be noted that when the main poppet is in open position, piston ring 23 uncovers the metering groove 24, thus creating a larger upstream orifice by which to pressurize actuation chamber 20 for fast response in closing.

The pressures $P_3$ in the actuation chamber 20 is then increased to $P_1$ since the downstream passage is closed by the control poppet 45. The spherical portion 15 of main poppet 13 is consequently mated with main seat 7 and stops the flow of fluid through the valve passage. It is to be further noted that when the main poppet 13 is in closed position, the metering passage is closed and fluid can only flow around the piston ring 23. The spring 22 merely aids the main poppet member to overcome the static frictional forces existing between the chamber and poppet members.

The force holding the main poppet closed is: $P_1$ multiplied by the overall area of the flange end of the main poppet ($A_1$) minus $P_2$ multiplied by the area of the main poppet through the seat portion 15 ($A_2$) and minus $P_1$ multiplied by the quantity $A_1$ minus $A_2$. Therefore; the $P_1-P_2$ muliplied by $A_2$. Diametrically shown the equa-force acting to close the main poppet equals the quantity tion would be:

Poppet closed $$P_1 A_1 \rightarrow | \quad | \leftarrow P_2 A_2$$
$$\quad | \quad | \leftarrow P_1(A_1 - A_2)$$

Force (closed) $= P_1 A_1 - P_2 A_2 - P_1 A_1 + P_1 A_2$
$= A_2(P_1 - P_2)$

In order to open the valve and permit fluid flow therethrough, the solenoid is energized to pull the orifice pin 46 away from the downstream orifice 33. Consequently, the actuation chamber pressure is dumped downstream to low pressure area $P_2$ with the only upstream orifice being the slight clearance around piston ring 23. Thus, a large pressure drop is created in the actuation chamber 20 and the main poppet is opened with a force of $P_3$ multiplied by $A_1$ minus $P_2$ multiplied by $A_2$ minus $P_1$ multiplied by the quantity $A_1$ minus $A_2$. Diametrically shown the equation would be:

Poppet open $$P_3 A_1 \rightarrow | \quad | \leftarrow P_2 A_2$$
$$\quad | \quad | \leftarrow P_1(A_1 - A_2)$$

Force (open) $= P_2 A_2 + P_1(A_1 - A_2) - P_3 A_1$
$= P_2 A_2 + P_1 A_1 - P_1 A_2$
$+ A_2(P_2 - P_1) - P_3 A_1$
$= A_1(P_1 - P_3) - A_2(P_1 - P_2)$ Comparing the diametric poppet opening and closing equational described forces, the only difference therebetween is a pressure change in actuation chamber 20.

Figure 1:
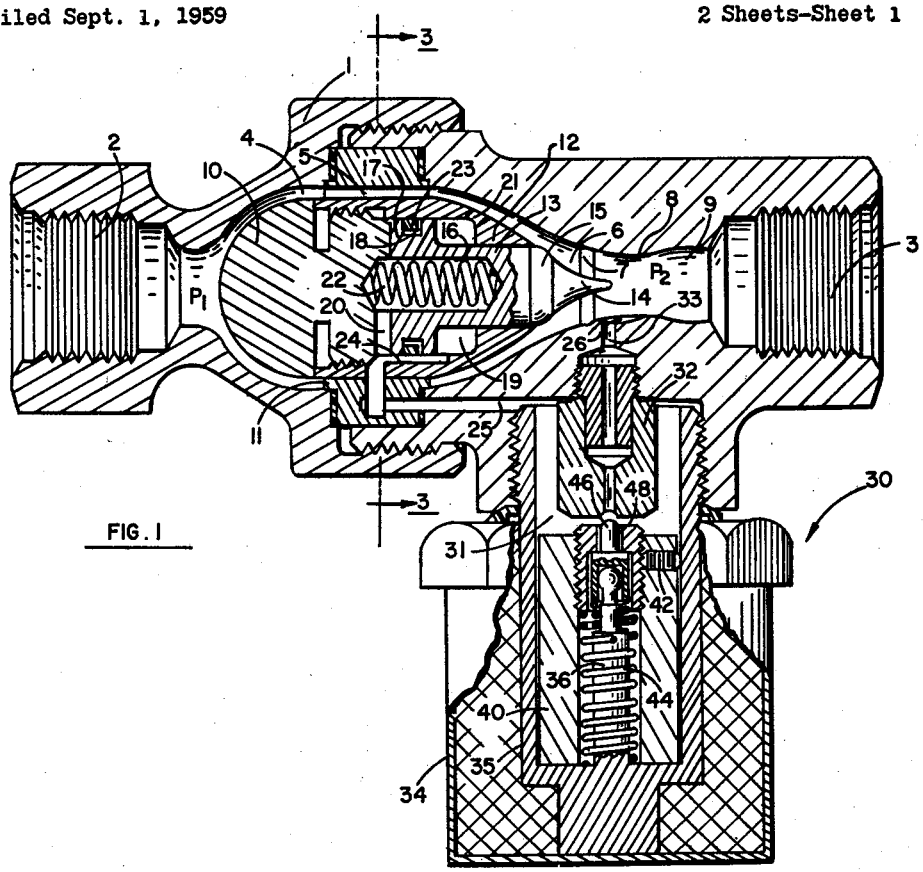
FIG. 1 is the longitudinal cross-sectional view of the fluid control valve.
Figure 2:
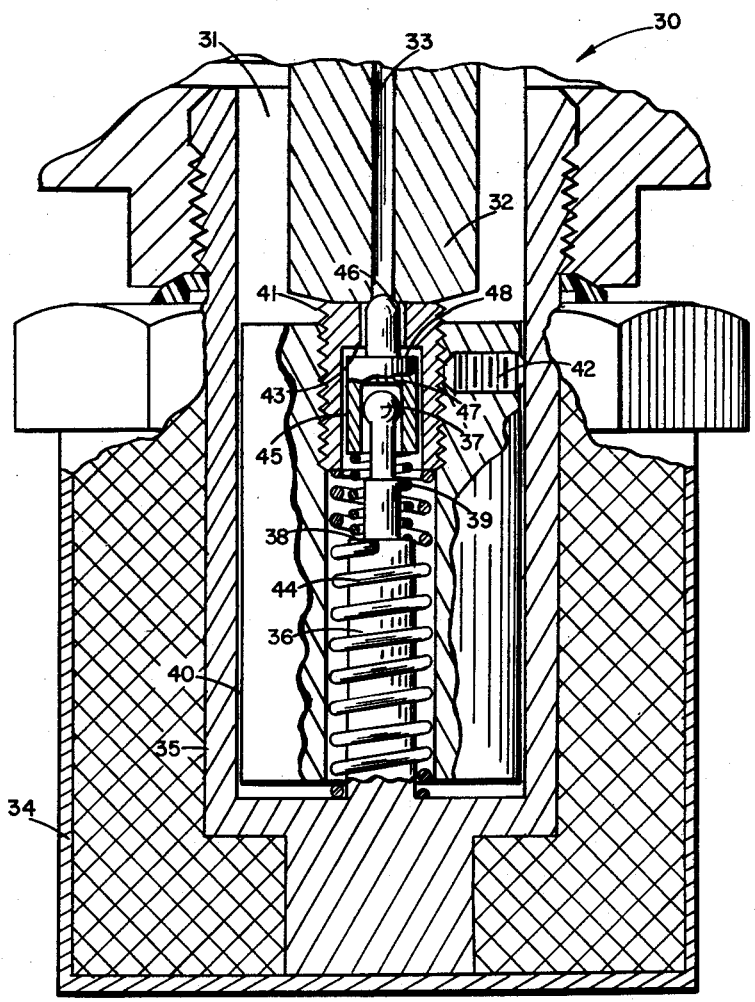
FIG. 2 is an enlarged cross-sectional view of the pilot valve in closed position.

Referring now more specifically to the pilot valve 30, the manner in which the poppet is mounted with respect to the solenoid permits the use of a relatively small poppet and the utilization of a small spring having a natural frequency vibration much higher than the frequencies encountered in a missile system. In opening the control poppet 45, coil 34 is energized and the plunger 40 and adjustment member 41 are thrust downwardly as shown in FIG. 1. The recess 43 of the adjustment member carries the control poppet down until the plunger is stopped by contact with the solenoid core. There is no further movement of the parts until the solenoid is de-energized. Upon de-energizing the solenoid coil, the return spring 44 will return the plunger and restore the adjustment member and poppet to a closed position as shown in FIG. 2.

This arrangement, whereby the poppet when in closed position is removed from physical contact with the plunger 40, provides a near perfect seal when the valve is subjected to severe vibrations.

It is to be understood that the anti-vibration pilot valve can be actuated by means other than a solenoid, for example, a diaphragm situated between the poppet member and the main body member sensitive to pressure differentials on either side thereof could be utilized.

It is obvious that such a system is one in which the pilot fluid loop does not rely on an outside high or low pressure dump port, unlike most pilot operated valves, but discharges the actuation chamber fluid directly into the main stream flow, thus providing for no fluid losses. The high pressure source comes from the upstream pressure and the low pressure dump is created by the low statis pressure in the throat. These novel concepts as integrated in this valve makes it possible to dispense with dynamic leakproof seals. The use of finely lapped spherical metal to metal seats in both the main and pilot poppets provide for a positive seal against leakage at extreme pressures and temperatures whereas elastic type seats would most probably fail.

The aforedescribed valve arrangement is adapted to be used at a wide range of operating conditions. While there are other valves which have operating pressure ranges of zero to 5000 p.s.i.g., none are known which can operate at ambient temperatures of $-320°$ F. and $+165°$ F., as well. The low temperature characteristics permit using the valve in a nitrogen or helium system in which the valve is submerged in a cryogenic fluid, for example. The valve is capable of handling 1.2 pounds per second of helium flow at 70° F., 3000 p.s.i.g. inlet pressure and 2200 p.s.i.g. outlet pressure. The amount of leakage about the poppet seats when in closed position, has been calculated as being approximately .6 standard cubic inch per minute of helium at 3000 p.s.i.g. inlet pressure, 0 p.s.i.g. outlet pressure and 70° F.

Other remarkable operating characteristics include an efficient functioning of the valve at any attitude while subjecting the valve to vibrational values of 25 g and 2000 c.p.s. Since the response time required for the opening and closing of a valve is of prime importance, the illustrated valves total time response of 0.040 second opening and 0.020 second closing is significant. The low operating pressure head loss also constitutes a distinguishing feature of the valve. While measuring the flow rate of 70° F. helium at 1.2 lb. per sec., the static pressure fell from 3000 at the inlet port 2 to 2200 p.s.i.g., at the outlet port 3. This is equivalent to a very efficient "K" factor of 1.58 where:

$$K = \frac{\Delta P \times 2g}{\gamma V^2}$$

$\Delta P$ = drop in static pressure, p.s.i.
$g$ = gravimetric constant, ft. per sec. per sec.
$\gamma$ = density of entering gas, lb. per cu. ft.
$V$ = velocity of entering gas, ft. per sec.

It is understood that various changes and modifications may be made in the embodiment illustrated and described herewith without departing from the scope of the invention as defined by the following claims.

We claim:

1. A solenoid control valve having an inlet passage and an outlet orifice defined by a tube; a cylindrically shaped poppet having a post with a spherically shaped head on one end thereof adapted to close the outlet orifice; the bottom end of said poppet having a recess therein, a flange portion intermediate said ends; coil energizing means adapted to actuate the poppet away from the outlet orifice and positioned radially exterior of said poppet member; a tubular solenoid core interior of said coil energizing means and surrounding said poppet member; a spherically shaped head post attached to said solenoid core, the spherical head of said post resting in the recess of said poppet and adapted to effect a radial positioning thereof; a post step on said post; spring means positioned between said post step and the bottom end of said poppet adapted to urge said poppet head against the outlet orifice; a cylindrical plunger interior of said core and exterior of said poppet adapted to be actuated by said coil energizing means; a cylindrical adjustment member having a top recess radially exterior of said poppet post and a bottom recess radially spaced from the top recess to form an interior flange therein adapted to abut the flange portion of said poppet when the outlet orifice is opened; complementary thread adjustment means on the exterior of said cylindrical adjustment member and the interior of said plunger for adjusting the adjustment member relative to said poppet; valve closing spring means between said core and adjustment member for urging said adjustment member toward and in abutting relation to said outlet tube.

2. A solenoid control valve having an inlet passage and a tube forming an outlet orifice the lower portion thereof forming a spherical seat; an energizing coil; a cylindrically shaped solenoid core in overlying relationship to the interior of the energizing coil; a post on the longitudinal axis of said cylindrical core and integral therewith; said post having a spherically shaped head on the extremity and a post step on the midportion thereof; a first spring member surrounding said post and resting on said post step; a cylindrical tube shaped plunger housing said post and in abutting relationship to said solenoid core; a cylindrical tube shaped adjustment member threadedly engaged to the top inner portion of the plunger and adapted to be adjusted to extend above the top of said plunger, the inner portion of said adjustment member having a recess thereon facing toward said post; a second spring member surrounding said post between said core and said adjustment member adapted to bias the adjustment member toward said tube forming the outlet orifice; a poppet consisting of a spherically headed upwardly extending pin and a downwardly extending cup shaped portion, the joinder of the pin and cup shaped portion forming a ledge adapted to abut the recess of said adjustment member; the cup shaped portion of said poppet positioned on the spherical head of said post so as to abut the first spring member, the first spring member thus being adapted to urge said poppet toward the outlet orifice.

3. A solenoid control valve comprising a body having an inlet passage and an outlet orifice therein, a poppet having a spherically shaped head thereon normally abutting said outlet orifice, solenoid actuating means for positively opening said poppet, said solenoid actuating means comprising an energizing coil and a plunger, said plunger having a lost motion connection with said poppet such that in the closed position of the poppet the plunger is free from contact therewith, antivibration means mounting the poppet on said body, said antivibration means including means forming a universal type joint with said poppet for permitting tilting movement of said poppet in various planes.

4. A valve comprising a body having an inlet passage and an outlet orifice therein, a poppet having a spherically shaped head thereon normally abutting said outlet orifice, actuating means for positively opening said poppet, said actuating means having a lost motion connection with said poppet such that in the closed position of the poppet the actuating means is free from contact therewith, antivibration means mounting the poppet on said body, said antivibration means being independent of said actuating means and including means forming a universal type joint with said poppet for permitting tilting movement of said poppet in various planes.

5. The structure of claim 4 wherein said actuating means comprises a solenoid having an energizing coil and a hollow plunger surrounding at least a part of said poppet, said lost motion connection comprising an adjustable member on the plunger and a cooperating shoulder on the poppet.

References Cited in the file of this patent

UNITED STATES PATENTS

| | | |
|---|---|---|
| 1,030,890 | Johnson | July 2, 1912 |
| 1,362,331 | Larner | Dec. 14, 1920 |
| 1,752,439 | Larner | Apr. 1, 1930 |
| 1,810,620 | Parks | June 16, 1931 |
| 1,899,731 | Scofield | Feb. 28, 1933 |
| 1,902,027 | Henkel | Mar. 21, 1933 |
| 1,961,599 | Schwitzer et al. | June 5, 1934 |
| 2,663,319 | Marinelli | Dec. 22, 1953 |
| 2,673,706 | Matteson | Mar. 30, 1954 |
| 2,679,856 | Geritsen et al. | June 1, 1954 |
| 2,705,608 | Phillips | Apr. 5, 1955 |
| 2,735,644 | Bishofberger | Feb. 21, 1956 |
| 2,783,019 | Houghton | Feb. 26, 1957 |
| 2,833,299 | Marriette | May 6, 1958 |
| 2,868,494 | Kearns et al. | Jan. 13, 1959 |
| 2,914,078 | McGowen | Nov. 24, 1959 |
| 2,925,985 | MacDavid | Feb. 23, 1960 |
| 2,926,883 | Prybylski et al. | Mar. 1, 1960 |

FOREIGN PATENTS

| | | |
|---|---|---|
| 167,996 | Germany | Feb. 28, 1906 |
| 536,880 | Italy | Dec. 12, 1955 |